US011399020B2

(12) United States Patent
Secomandi et al.

(10) Patent No.: US 11,399,020 B2
(45) Date of Patent: Jul. 26, 2022

(54) SYSTEM AND METHOD FOR AUTHENTICATING SERVER IDENTITY DURING CONNECTION ESTABLISHMENT WITH CLIENT MACHINE (71) Applicant: HCL Technologies Italy S.p.A, Milan (IT)

(72) Inventors: Antonio Secomandi, Rome (IT); Viviana Tripodi, Rome (IT)

(73) Assignee: HCL Technologies Italy S.p.A, Milan (IT)

( * ) Notice: Subject to any disclaimer, the term of this patent is extended or adjusted under 35 U.S.C. 154(b) by 663 days.

(21) Appl. No.: 16/457,761

(22) Filed: Jun. 28, 2019

(65) Prior Publication Data
US 2020/0412711 A1 Dec. 31, 2020

(51) Int. Cl.
*H04L 9/40* (2022.01)
*G06F 16/953* (2019.01)
*G06F 16/22* (2019.01)

(52) U.S. Cl.
CPC ...... *H04L 63/0823* (2013.01); *G06F 16/2246* (2019.01); *G06F 16/953* (2019.01)

(58) Field of Classification Search
CPC . H04L 63/0823; H04L 63/1483; H04L 9/006; H04L 9/3263; G06F 16/2246; G06F 16/953; G06F 21/33
See application file for complete search history.

(56) References Cited

U.S. PATENT DOCUMENTS

| 6,189,098 | B1 | 2/2001 | Kaliski, Jr. | |
|---|---|---|---|---|
| 6,301,659 | B1 | 10/2001 | Micali | |
| 8,078,866 | B2 | 12/2011 | Xiao | |
| 8,595,484 | B2 | 11/2013 | Thomas et al. | |
| 10,033,720 | B2 | 7/2018 | Li et al. | |
| 2002/0087479 | A1* | 7/2002 | Malcolm | G06Q 20/3674 705/64 |
| 2002/0152382 | A1* | 10/2002 | Xiao | G06F 21/604 713/173 |
| 2003/0217265 | A1 | 11/2003 | Nakano et al. | |

(Continued)

FOREIGN PATENT DOCUMENTS

EP 1905191 B1 9/2014

OTHER PUBLICATIONS

Suzan Mendes et al. ("A New Approach to the X.509 Framework: Allowing a Global Authentication Infrastructure without a Global Trust Model," IEEE 1995, pp. 172-189 (Year: 1995).*

(Continued)

*Primary Examiner* — Luu T Pham
*Assistant Examiner* — Canh Le
(74) *Attorney, Agent, or Firm* — Kendal Sheets (57) ABSTRACT

Disclosed is a system for notifying hacking to a user thereby ensuring verified connection of a client machine with a server intended to be connected is disclosed. The system acquires a server certificate comprising data structure. The data structure may be acquired upon receipt of a response to a request initiated by the client machine. In one aspect, the data structure may be referred to as a tree site to verifier pertaining to the request. The system further receives a validation acknowledgement indicating validity of the server certificate. The system further performs a reverse certificate look up verification process upon receipt of the acknowledgment.

9 Claims, 7 Drawing Sheets

(56) References Cited

U.S. PATENT DOCUMENTS

| | | |
|---|---|---|
| 2005/0114666 A1 | 5/2005 | Sudia |
| 2011/0099362 A1 | 4/2011 | Haga et al. |
| 2011/0252227 A1* | 10/2011 | Strong ................. H04L 63/166 |
| | | 713/168 |
| 2016/0080363 A1* | 3/2016 | Taboso ................ H04L 63/0823 |
| | | 713/156 |
| 2019/0362014 A1* | 11/2019 | Ikhlaq ................. G06F 16/9024 |
| 2020/0065599 A1* | 2/2020 | Sosa-Trustham .... G06V 30/153 |

OTHER PUBLICATIONS

Balachandra Prema K.V ("Certificate Path Verification in Hierarchical and Peer-to-Peer Public Key Infrastructures," Apr. 2010, pp. 77-92. (Year: 2010).*

* cited by examiner

SYSTEM AND METHOD FOR AUTHENTICATING SERVER IDENTITY DURING CONNECTION ESTABLISHMENT WITH CLIENT MACHINE

TECHNICAL FIELD

The present invention described herein, in general, relates to a field of cryptographic Public Key Infrastructure (PKI). More specifically, to the system and method for performing certificate chain validation, by a client machine, to validate and trust a server during handshaking process.

BACKGROUND

In cryptography, Public-key cryptography or asymmetric cryptography is a cryptographic system that uses pairs of keys i.e. public keys that may be disseminated widely, and private keys that are known only to an owner. Two of the best-known uses of public key cryptography are:

Public key encryption in which a message is encrypted with a recipient's public key. The message cannot be decrypted by anyone who does not possess the matching private key. Digital signatures, in which a message is signed with the sender's private key and may be verified by anyone who has access to the sender's public key. This verification proves that the sender has access to the private key and therefore is likely to be the person associated with the public key.

A central problem with the use of public key cryptography is confidence/proof that a public key is authentic, in that it is correct and belongs to a person or entity claimed and has not been tampered with or replaced by a malicious third party. The usual approach to this problem is to use a Public Key Infrastructure (PKI), in which one or more third parties known as certificate authorities certify ownership of key pairs. This certification of ownership is performed by the certification authority by digitally signing a public key certificate (also known as a X.509 digital certificate or identity certificate) to prove ownership of the private key containing a public key and an identity (a hostname, or an organization, or an individual).

In an example, when a browser, on a client machine, connects to a server, the browser receives a certificate from the server allowing the browser to confirm the server identity. This certificate is signed by a Certificate Authority. During the connection establishment process, the browser validates the certificate and performs, among other checks the certificate chain validation. During the certificate chain validation, the certificate is considered trusted if the certificates of the Certificate Authority are available in the browser or system trust store. This presence is needed to verify that the server certificate signature is valid and not tampered.

Even after conducting various checks to ensure the authenticity of the certificate, intruders may leverage certain loop holes in the existing technological methodologies to sneak into the trusted connection established between the server and the client machine. This is because, the mechanism used to validate the certificate is weak and vulnerable as a fake server responds to URL request, generated from the browser of the client machine, and pretends as the server to which the client machine intended to be connected. In such a scenario, the fake server creates a fake certificate claiming whatever identity intends to impersonate and sign the fake certificate.

Other point of vulnerability in the conventional approaches is that when a key is known to have been compromised, such key may be fixed by revoking the certificate. However, such a compromise is not easily detectable and can be a huge security breach as security patch may be needed to revoke intermediary certificates issued by a compromised root certificate authority.

SUMMARY

Before the present systems and methods, are described, it is to be understood that this application is not limited to the systems, and methodologies described, as there can be multiple possible embodiments which are not expressly illustrated in the present disclosure. It is also to be understood that the terminology used in the description is for describing the versions or embodiments only, and is not intended to limit the scope of the present application. This summary is provided to introduce concepts related to systems and methods for notifying hacking to a user thereby ensuring verified connection of the client machine with a server intended to be connected and the concepts are further described below in the detailed description. This summary is not intended to identify essential features of the claimed subject matter nor is it intended for use in limiting the scope of the claimed subject matter.

In one implementation, a system for notifying hacking, of a client machine, to a user thereby ensuring verified connection of the client machine with a server intended to be connected is disclosed. The system may comprise a processor and a memory coupled to the processor. The processor may execute a plurality of modules present in the memory. The plurality of modules may comprise an acquisition module, a server certificate validation module, and a reverse certificate look up verification module. The acquisition module may acquire a server certificate comprising data structure. The data structure may be acquired upon receipt of a response to a request initiated by the client machine. In one aspect, the data structure may be referred to as a tree site to verifier pertaining to the request. The server certificate validation module may receive a validation acknowledgement indicating validity of the server certificate. The reverse certificate look up verification module may perform a reverse certificate look up verification process upon receipt of the acknowledgment. In one aspect, the reverse certificate look up verification may be performed by determining existence of at least one of a first set of pre-stored data structure and a second set of pre-stored data structure upon navigating the tree site to verifier. In one aspect, the tree site to verifier indicates a pre-stored data structure maintained by the client machine. Upon determining the existence, the pre-stored data structure, of the first set of pre-stored data structures or the second set of pre-stored data structures, may be correlated with the data structure upon referring to a certificate issuer look up server, when at least one of the first set of pre-stored data structures and the second set of pre-stored data structures exists. In one aspect, the correlation may be performed to authenticate the server certificate. After the correlation, one or more certificate issuing authorities may be queried, by the certificate issuer look up server, to compute a first metadata based on a serial number when the pre-stored data structure is matched with the data structure. Post querying, the first metadata may be validated with the data structure pertaining to the server certificate. Upon validation, a first signal indicating threat of hacking may be notified to a user when the first metadata is invalidated with the data structure thereby updating the tree site to verifier with the first metadata when the first metadata is validated with the data structure. After notifying the first signal to the user, the client machine and a certificate authority verifier server may be enabled to generate a random numeral and thereby executing a function on the random numeral and a certificate hash value of the server certificate present in the data structure. The client machine and the certificate authority verifier server may generate a first code and a second code respectively upon execution of the function. Subsequently, a second signal indicating the threat of hacking may be notified to the user when the first code and the second code are unmatched, thereby ensuring connection of the client machine with the server intended to be connected by validating the server certificate issued to the client machine.

In another implementation, a method for notifying hacking to a user thereby ensuring verified connection of the client machine with a server intended to be connected is disclosed. In order to notify the hacking, initially, a server certificate comprising data structure may be acquired. The data structure may be acquired upon receipt of a response to a request initiated by the client machine. In one aspect, the data structure may be referred to as a tree site to verifier pertaining to the request. After the acquisition of the server certificate, a validation acknowledgement indicating validity of the server certificate may be received. Subsequently, a reverse certificate look up verification process may be performed upon receipt of the acknowledgment. In one aspect, the reverse certificate look up verification may be performed by determining existence of at least one of a first set of pre-stored data structure and a second set of pre-stored data structure upon navigating the tree site to verifier. In one aspect, the tree site to verifier indicates a pre-stored data structure maintained by the client machine. Upon determining the existence, the pre-stored data structure, of the first set of pre-stored data structures or the second set of pre-stored data structures, may be correlated with the data structure upon referring to a certificate issuer look up server, when at least one of the first set of pre-stored data structures and the second set of pre-stored data structures exists. In one aspect, the correlation may be performed to authenticate the server certificate. After the correlation, one or more certificate issuing authorities may be queried, by the certificate issuer look up server, to compute a first metadata based on a serial number when the pre-stored data structure is matched with the data structure. Post querying the one or more certificate issuing authorities, the first metadata may be validated with the data structure pertaining to the server certificate. Upon validation, a first signal indicating threat of hacking may be notified to a user when the first metadata is invalidated with the data structure thereby updating the tree site to verifier with the first metadata when the first metadata is validated with the data structure. After notifying the first signal to the user, the client machine and a certificate authority verifier server may be enabled to generate a random numeral and thereby executing a function on the random numeral and a certificate hash value of the server certificate present in the data structure. The client machine and the certificate authority verifier server may generate a first code and a second code respectively upon execution of the function. Subsequently, a second signal indicating the threat of hacking on the client machine may be notified to the user when the first code and the second code are unmatched thereby ensuring connection of the client machine with the server intended to be connected by validating the server certificate issued to the client machine. In one aspect, the above method for notifying hacking may be performed by a processor using programmed instructions stored in a memory.

In yet another implementation, non-transitory computer readable medium embodying a program executable in a computing device for notifying hacking to a user thereby ensuring verified connection of the client machine with a server intended to be connected characterized by validating a server certificate issued to the client machine is disclosed. The program may comprise a program code for acquiring a server certificate comprising data structure, wherein the data structure is acquired upon receipt of a response to a request initiated by the client machine, and wherein the data structure is referred to as a tree site to verifier pertaining to the request. The program may further comprise a program code for receiving a validation acknowledgement indicating validity of the server certificate. The program may further comprise a program code for performing a reverse certificate look up verification process upon receipt of the acknowledgment, wherein the reverse certificate look up verification is performed by determining existence of at least one of a first set of pre-stored data structure and a second set of pre-stored data structure upon navigating the tree site to verifier. The tree site to verifier indicates a pre-stored data structure maintained by the client machine. Upon determining the existence, the pre-stored data structure, of the first set of pre-stored data structures or the second set of pre-stored data structures, may be correlated with the data structure upon referring to a certificate issuer look up server, when at least one of the first set of pre-stored data structures and the second set of pre-stored data structures exists. In one aspect, the correlation may be performed to authenticate the server certificate. After the correlation, one or more certificate issuing authorities may be queried, by the certificate issuer look up server, to compute a first metadata, pertaining to the server certificate, based on a serial number when the pre-stored data structure is matched with the data structure. Post querying, the first metadata may be validated with the data structure pertaining to the server certificate. Upon validation, a first signal indicating threat of hacking may be notified to a user when the first metadata is invalidated with the data structure thereby updating the tree site to verifier with the first metadata when the first metadata is validated with the data structure. After notifying the first signal to the user, the client machine and a certificate authority verifier server may be enabled to generate a random numeral and thereby executing a function on the random numeral and a certificate hash value of the server certificate present in the data structure. The client machine and the certificate authority verifier server may generate a first code and a second code respectively upon execution of the function. Subsequently, a second signal indicating the threat of hacking may be notified to the user when the first code and the second code are unmatched thereby ensuring connection of the client machine with the server intended to be connected by validating the server certificate issued to the client machine.

BRIEF DESCRIPTION OF THE DRAWINGS

The foregoing detailed description of embodiments is better understood when read in conjunction with the appended drawings. For illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention facilitates to notify hacking to a user thereby ensuring verified connection of the client machine with a server intended to be connected by validating a server certificate presented to the client machine. More specifically, the system creates a mechanism that ensures an accurate and reliable server certificate verification in cases where the client system or other surrounding infrastructure components have been compromised. This may be accomplished by leveraging an additional verification layer (named Reverse Certificate Lookup and Verification) implemented in addition to the current certificate validation and use of a client mechanism (named Site to Validator tree) that is able to detect variations of the connection characteristics.

Figure 1:
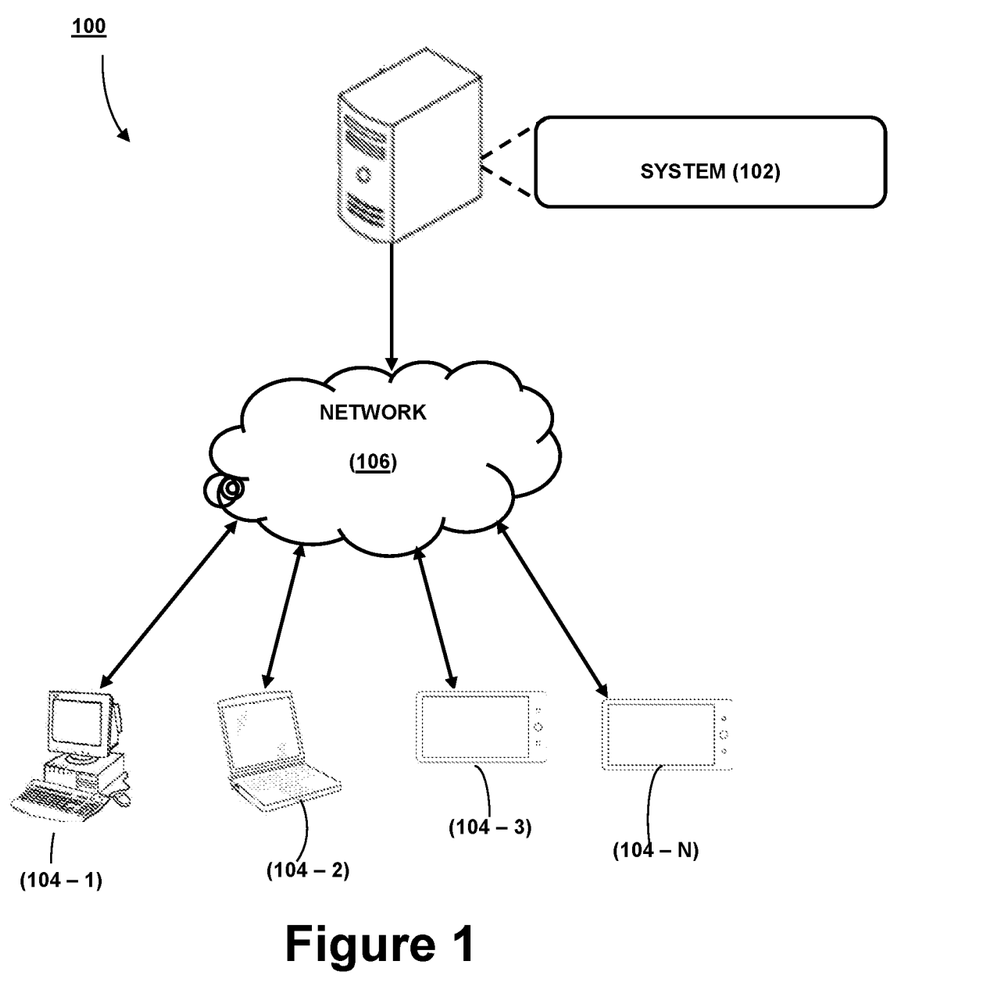
FIG. 1 illustrates a network implementation of a system for notifying hacking to a user thereby ensuring verified connection of the client machine with a server intended to be connected, in accordance with an embodiment of the present subject matter.

Referring now to FIG. 1, a network implementation 100 of a system 102 for notifying hacking to a user thereby ensuring verified connection of the client machine with a server intended to be connected is disclosed. In order to ensure verified connection of the client machine with the server, initially, the system 102 acquires a server certificate comprising data structure. The data structure may be acquired upon receipt of a response to a request initiated by the client machine. In one aspect, the data structure may be referred to as a tree site to verifier pertaining to the request. After the acquisition of the server certificate, the system 102 further receives a validation acknowledgement indicating validity of the server certificate. Subsequently, the system 102 further performs a reverse certificate look up verification process upon receipt of the acknowledgment. The reverse certificate look up verification may be performed by determining existence of at least one of a first set of pre-stored data structure and a second set of pre-stored data structure upon navigating the tree site to verifier. In one aspect, the tree site to verifier indicates a pre-stored data structure maintained by the client machine. Upon determining the existence, the system 102 further correlates the pre-stored data structure, of the first set of pre-stored data structures or the second set of pre-stored data structures, with the data structure upon referring to a certificate issuer look up server, when at least one of the first set of pre-stored data structures and the second set of pre-stored data structures exists. In one aspect, the correlation may be performed to authenticate the server certificate. After the correlation, the system 102 further quires one or more certificate issuing authorities to compute a first metadata based on a serial number when the pre-stored data structure is matched with the data structure. Post querying the one or more certificate issuing authorities, the system 102 further validates the first metadata with the data structure pertaining to the server certificate. Upon validation, the system 102 further notifies a first signal indicating threat of hacking to a user when the first metadata is invalidated with the data structure thereby updating the tree site to verifier with the first metadata when the first metadata is validated with the data structure. After notifying the first signal to the user, the system 102 further enable the client machine and a certificate authority verifier server to generate a random numeral and thereby executing a function on the random numeral and a certificate hash value of the server certificate present in the data structure. In one aspect, the client machine and the certificate authority verifier server may generate a first code and a second code respectively upon execution of the function. Subsequently, the system 102 further notifies a second signal indicating the threat of hacking on the client machine to the user when the first code and the second code are unmatched thereby ensuring connection of the client machine with the server intended to be connected by validating the server certificate issued to the client machine.

Although the present disclosure is explained considering that the system 102 is implemented on a client system, it may be understood that the system 102 may be implemented in a variety of computing systems, such as a laptop computer, a desktop computer, a notebook, a workstation, a mainframe computer, a server, a network server, a cloud-based computing environment, and the client machine 104. It will be understood that the system 102 may be accessed by multiple users through one or more client machines 104-1, 104-2 . . . 104-N, collectively referred to as user 104 or stakeholders, hereinafter, or applications residing on the client machines 104. In one implementation, the system 102 may comprise the cloud-based computing environment in which a user may operate individual computing systems configured to execute remotely located applications. The client machines 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Hypertext Transfer Protocol Secure (HTTPS), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
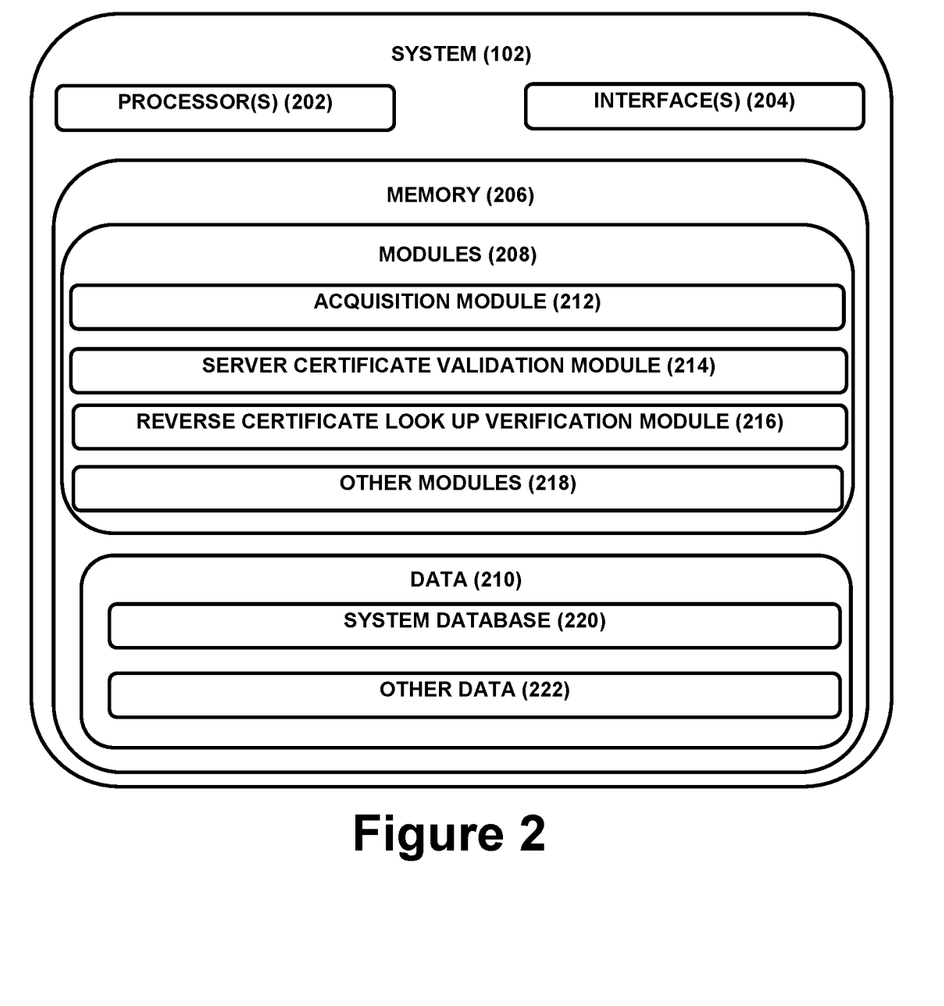
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform tasks or implement abstract data types. In one implementation, the modules 208 may include an acquisition module 212, a server certificate validation 214, a reverse certificate look up verification module 216, and other modules 218. The other modules 218 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 220 and other data 222. The other data 222 may include data generated as a result of the execution of one or more modules in the other modules 218.

As there are various challenges observed in the existing art, the challenges necessitate the need to build the system 102 for notifying hacking to a user thereby ensuring verified connection of the client machine with a server intended to be connected. In order to ensure verified connection of the client machine with the server, the system 102 employs the acquisition module 212, the server certificate validation 214, and the reverse certificate look up verification module 216. Detailed functioning of these modules is given below.

Figure 3:
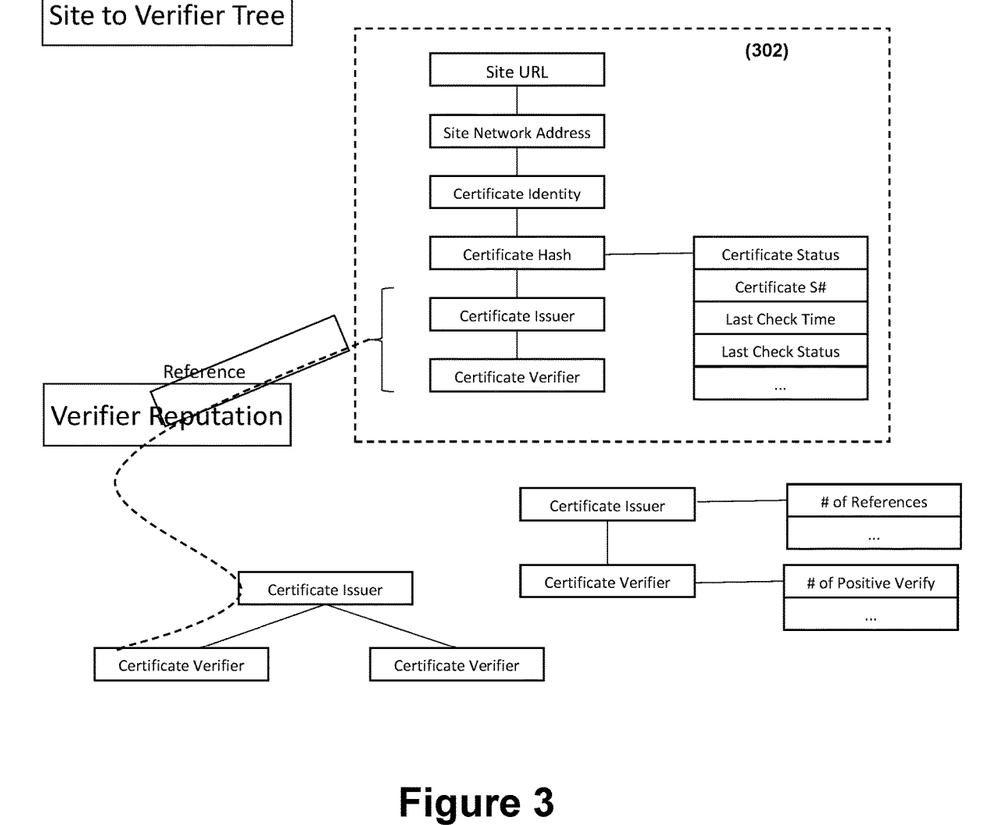
FIGS. 3 to 6 illustrate various implementations of the system for notifying hacking.

The acquisition module 212 acquires a server certificate comprising data structure 302, as shown in FIG. 3. In one aspect, the data structure 302 may be acquired upon receipt of a response to a request initiated by the client machine 104. It may be noted that the data structure 302 may include, but not limited to, a site Uniform Resource Locator (URL), a server identity, a site network address, a certificate identity, a certificate hash value of the server certificate, a certificate Issuer, and a certificate verifier. The certificate hash value may further comprise validity, certificate status, Last Check Time, Last Check Status, and Number of Visits. It may be noted that the data structure is referred to as a tree site to verifier, as shown in the FIG. 3, pertaining to the request.

Figure 4:
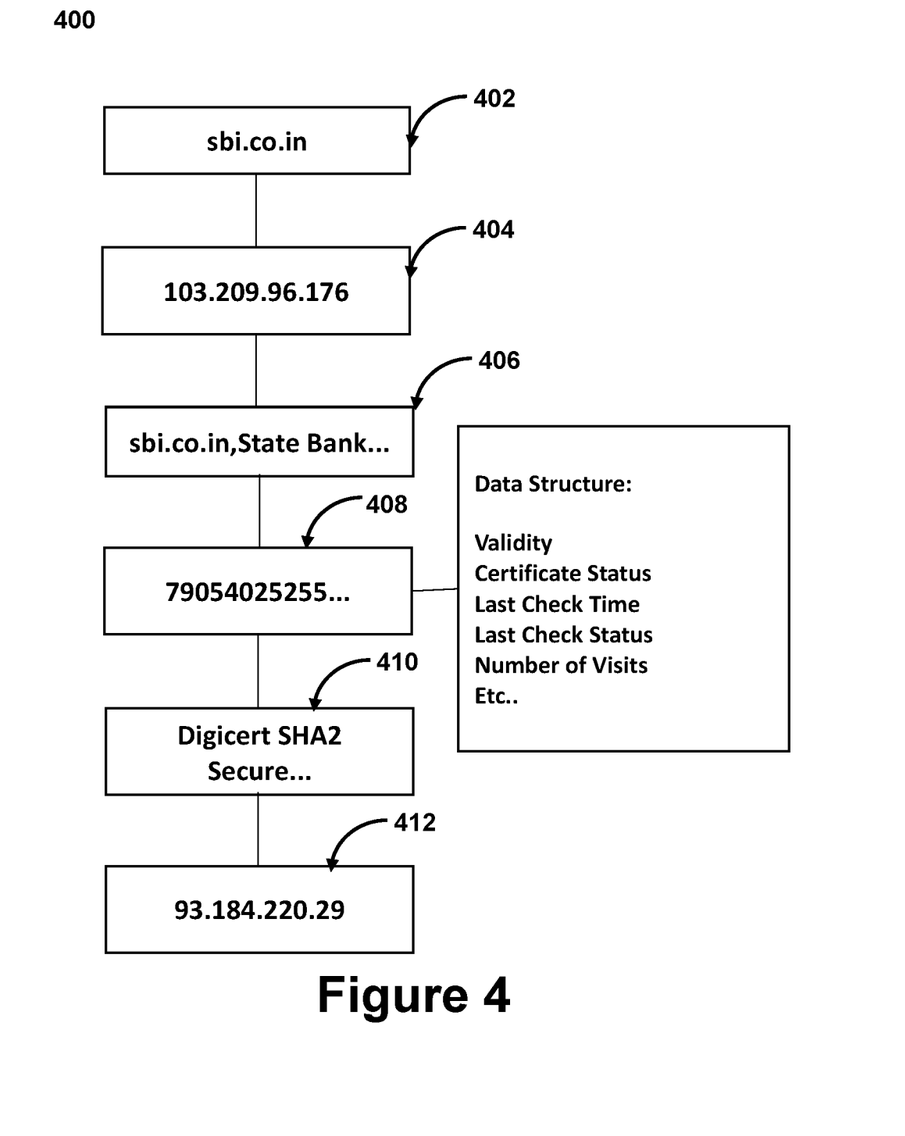

Referring to FIG. 4, in order to elucidate the aforementioned data structure, also referred to as tree site to verifier 400; consider an example where the intention of a user is to access a website of State Bank of India™ using a browser. Once the website is accessed by the user, the acquisition module 212 acquires the data structure represented in the form of the tree site to verifier. It may be noted that the site URL of the aforementioned bank website is https://sbi.co.in/, as shown in block 402. The next element down in the tree site to verifier is the Internet Protocol (IP) address i.e. '103.209.96.176', as shown in block 404 that is associated to State Bank of India™. The client machine 104 establishes the connection with the server. When the server of the State Bank of India™ responds to the browser request, the server presents a server certificate and its identity, as shown in block 406.

It may be understood that the server certificate itself is a file. Upon receipt of the file, the client machine 104 computes a hash value of the server certificate to place in the tree site to verifier 400. In one instance, the hash value is computed as '79054025255fb1a26e4bc422aef54eb4', as shown in block 408. The server certificate also provides the issuer 'DigiCert SHA2 Secure Server CA' of the server certificate, that is the entity that has signed the server certificate, as shown in block 410. In order to ensure verified connection of the client machine with the server intended to be connected, the system 102 further triggers the reverse certificate look up verification module 216 recovering the Internet Protocol (IP) address of the certificate verifier i.e. '93.184.220.29', as shown in block 412.

Thus, in this manner, the acquisition module 212 acquires the server certificate comprising data structure 302 in the form of tree site to verifier 400. Post-acquisition of the data structure, the server certificate validation module 214, as shown in block 502 of FIG. 5, receives a validation acknowledgement indicating validity of the server certificate. It may be noted that the server certificate validation module 214 validates the server certificate upon referring to an existing tree.

Figure 5:
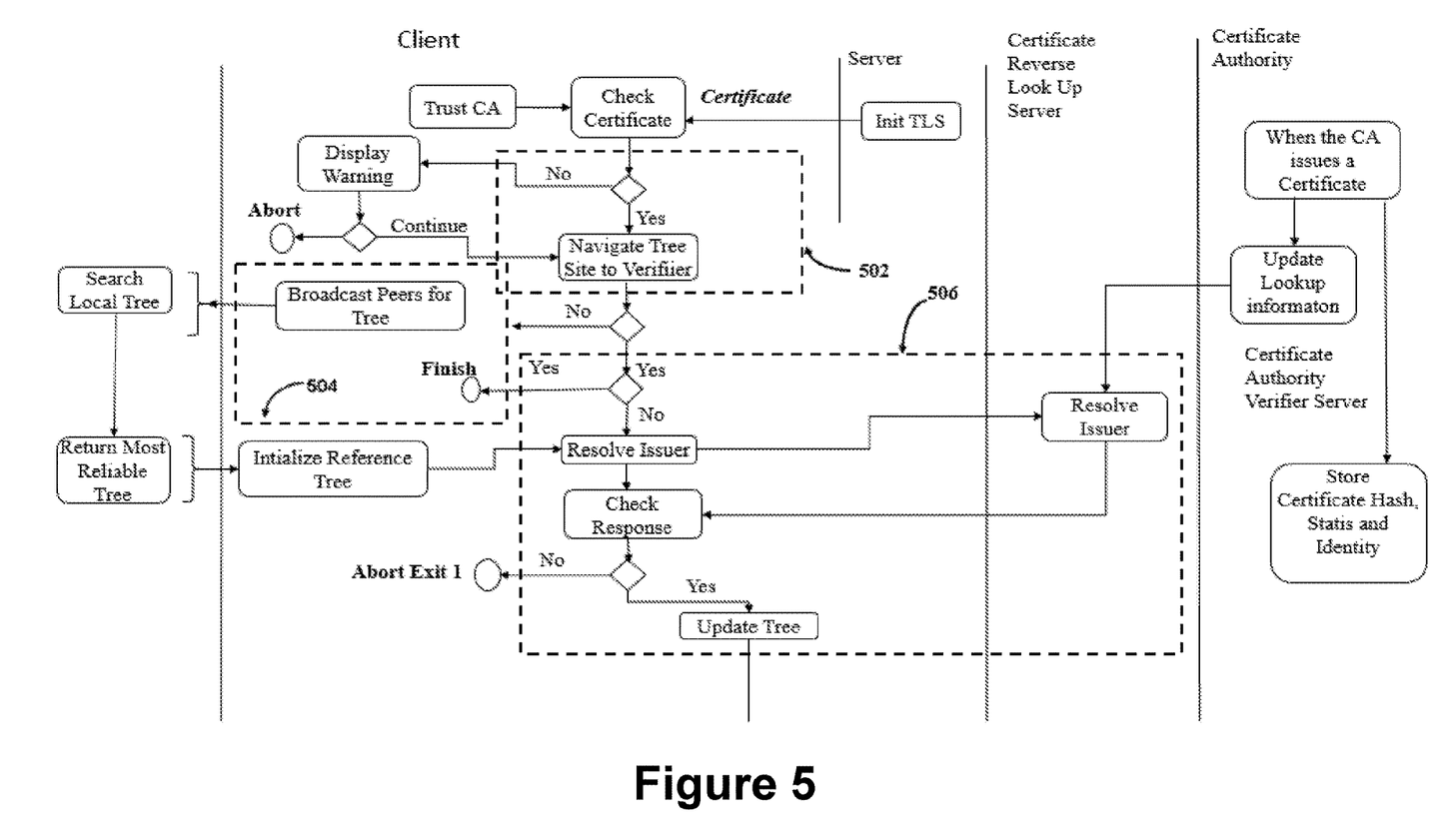

As shown in block 504, if the existing tree is not present in the client machine 104, the server certificate validation module 214 coordinates with one or more peer machines, communicatively coupled with the client machine 104, so as to select a reference existing tree. It may be noted that the reference existing tree may be selected based on a weighted score assigned to each peer, of the one or more peer machines, by using a predefined formulation. For instance, the weighted score may be computed with the formula "1/n" where 'n' is the number of hops to reach the peer machine. If the peer machine is in the same LAN network 106, parameter 'n' becomes '1' and the peer machine is assigned with the highest score. Upon determination of the peer machine, the reference existing tree may be retrieved and used a reference for validating the server certificate.

Subsequently, as shown in block 506, the reverse certificate look up verification module 216 performs a reverse certificate look up verification process upon receipt of the acknowledgment. In one aspect, the reverse certificate look up verification may be performed by determining existence of at least one of a first set of pre-stored data structure and a second set of pre-stored data structure upon navigating the tree site to verifier. The tree site to verifier indicates a pre-stored data structure maintained by the client machine. Upon determining the existence, the pre-stored data structure, of the first set of pre-stored data structures or the second set of pre-stored data structures, may be correlated with the data structure upon referring to a certificate issuer look up server, when at least one of the first set of pre-stored data structures and the second set of pre-stored data structures exists. In one aspect, the correlation may be performed to authenticate the server certificate.

After the correlation, one or more certificate issuing authorities may be queried, by the certificate issuer look up server, to compute a first metadata based on a serial number when the pre-stored data structure is matched with the data structure. In one aspect, the first metadata may be computed based on a pre-stored certificate identity, a pre-stored certificate hash value, a pre-stored certificate status. Post querying, the first metadata may be validated with the data structure pertaining to the server certificate. Upon validation, a first signal indicating threat of hacking may be notified to a user when the first metadata is invalidated with the data structure thereby updating the tree site to verifier with the first metadata when the first metadata is validated with the data structure. In one aspect, the first metadata may be invalidated with the data structure when the pre-stored certificate identity, the pre-stored certificate hash value, and the pre-stored certificate status are unmatched with the certificate identity, the certificate hash value, and the certificate status respectively.

Figure 6:
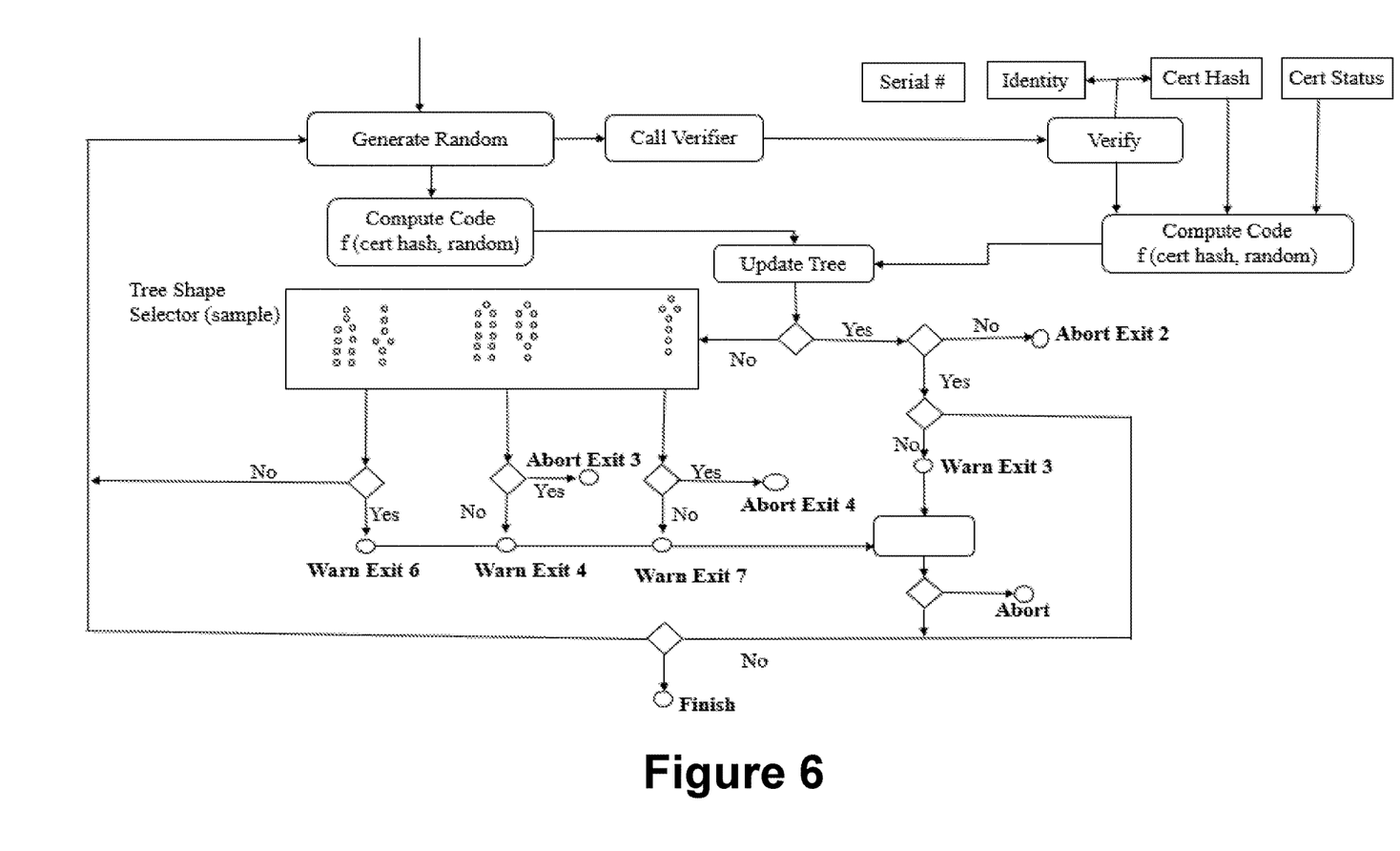

After notifying the first signal to the user, the reverse certificate look up verification module 216, as illustrated in FIG. 6, enable the client machine and a certificate authority verifier server to generate a random numeral and thereby executing a function on the random numeral and a certificate hash value of the server certificate present in the data structure. It may be noted that the certificate authority verifier server is a service that the Certificate Authority (CA) provides to allow for a mechanism used to verify certificate authenticity. When a certificate is signed/issued, the CA stores the Identity, the Serial Number, the Hash value of the certificate, and the certificate status in the system database 220.

In order to authenticate the certificate, the client machine 104 and the certificate authority verifier server may generate a first code and a second code respectively upon execution of the function. Subsequently, a second signal indicating the threat of hacking on the client machine 104 may be notified to the user when the first code and the second code are unmatched thereby ensuring connection of the client machine with the server intended to be connected by validating the server certificate issued to the client machine.

Referring to FIGS. 5 and 6 and the methodology of the system 102 as explained above, the client machine 104 leverages the above-mentioned configuration to determine the trustful level of the server certificate. The following sections describes various scenarios where hacking situation [s] may occur are illustrated. In one embodiment, it may be understood that a Fake Server is a malicious server that responds to the browser request in place of the legitimate server. The certificate that such server provides to the client in order to claim its identity can be a Fake Certificate in case it was not signed by a Legitimate Certificate Authority or a Legitimate Certificate in case the certificate was signed by a Legitimate Certificate Authority.

Scenario 1: Fake Server with Fake Certificate

With an operational and non-compromised Reverse Certificate Look Up and Verification, the system 102 detects suspicious activity and takes Abort Exit 1 as illustrated in FIG. 5.

With a Compromised Certificate Issuer Look Up so that the Fake Certificate SHA is returned with a reputable verifier, the system takes Abort Exit 2 as illustrated in the FIG. 6.

With a Compromised Certificate Issuer Look Up so that the Fake Certificate SHA and a Fake Verifier is returned, the system 102 take Warn Exit 3, and then if Continue Abort Exit 3, as illustrated in the FIG. 6.

With a Compromised Certificate Issuer Look Up so that the Fake Certificate SHA is returned with a reputable Verifier and a Compromised Verifier uses a Fake Certificate SHA in the computation, the system 102 revokes the legitimate certificate, Abort Exit 3 otherwise Warn Exit 4, as illustrated in the FIG. 6.

Scenario 2: Fake Server with Legitimate Certificate

With an operational and non-compromised Reverse Certificate Look Up and Verification, the system 102 detects suspicious activity and takes Abort Exit 3 as illustrated in the FIG. 6.

Scenario 3: Fake Server with Stolen Real Server Certificate

With an operational and non-compromised Reverse Certificate Look Up and Verification, the system 102 detects suspicious activity and takes Abort Exit 4 as illustrated in the FIG. 6. If the server is unreachable, the system 102 takes Abort Exit 7 as illustrated in the FIG. 6.

Scenario 4: Fake Server with Stolen CA Signing Certificate

With an operational and non-compromised Reverse Certificate Look Up and Verification, the system 102 detects suspicious activity and takes Abort Exit 1, as illustrated in the FIG. 6, when values, associated to the data structure, returned from the Certificate Issuer Look Up are not matched.

With Compromised Certificate Issuer Look Up so that the Fake Certificate SHA is returned with a reputable Verifier, the system 102 takes Abort Exit 2 when the Code Comparison mismatched as the SHA used for the computation is different.

With Compromised Certificate Issuer Look Up so that the Fake Certificate SHA and a Fake Verifier is returned, the system 102 takes Warn Exit 3 and then if Continue Abort Exit 3 as illustrated in the FIG. 6.

With the Compromised Certificate Issuer Look Up so that the Fake Certificate SHA is returned with a reputable Verifier and Compromised Verifier using a Fake Certificate SHA in the computation, the system 102 revokes the legitimate certificate, Abort Exit 3 otherwise Warn Exit 4 as illustrated in the FIG. 6.

Scenario 5: System Reaction to Certificate Renewals

When the legitimate server with existing certificate is relocated to a new location, the system 102 takes Warn Exit 7 as illustrated in the FIG. 6. On the contrary, if the legitimate server is still responsive on the original address, the system 102 takes Abort Exit 4 as illustrated in the FIG. 6.

When a new signed certificate is issued from the same CA, the system 102 takes Warn Exit 6 until the original certificate expires as illustrated in the FIG. 6. On the other hand, when a new signed certificate is issued from a new CA, the system 102 takes Warn Exit 6 until the original certificate expires as illustrated in the FIG. 6.

Figure 7:
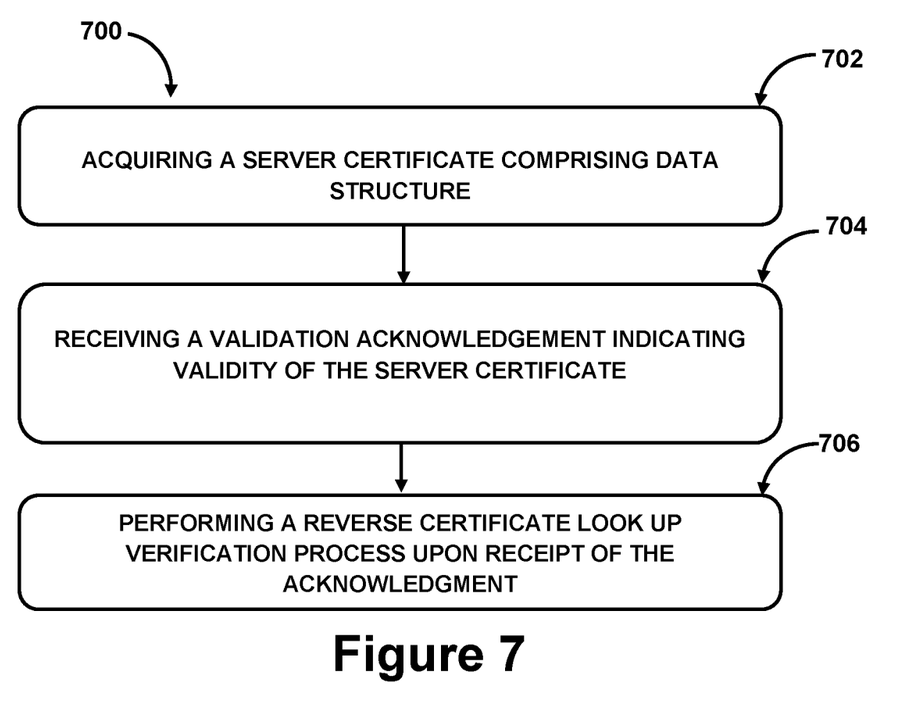
FIG. 7 illustrates a method for notifying the hacking, in accordance with an embodiment of the present subject matter.

Referring now to FIG. 7, a method 700 for method for notifying hacking, of a client machine, to a user thereby ensuring verified connection of the client machine with a server intended to be connected, in accordance with an embodiment of the present subject matter. The method 700 may be described in the general context of computer executable instructions. Generally, computer executable instructions can include routines, programs, objects, components, data structures, procedures, modules, functions, etc., that perform particular functions or implement particular abstract data types. The method 700 may also be practiced in a distributed computing environment where functions are performed by remote processing devices that are linked through a communications network. In a distributed computing environment, computer executable instructions may be located in both local and remote computer storage media, including memory storage devices.

The order in which the method 700 is described is not intended to be construed as a limitation, and any number of the described method blocks can be combined in any order to implement the method 700 or alternate methods. Additionally, individual blocks may be deleted from the method 700 without departing from the spirit and scope of the subject matter described herein. Furthermore, the method can be implemented in any suitable hardware, software, firmware, or combination thereof. However, for ease of explanation, in the embodiments described below, the method 700 may be considered to be implemented as described in the system 102.

At block 702, a server certificate comprising data structure may be acquired. In one aspect, the data structure may be acquired upon receipt of a response to a request initiated by the client machine. The data structure may be referred to as a tree site to verifier pertaining to the request. In one implementation, the server certificate may be acquired by the acquisition module 212.

At block 704, a validation acknowledgement indicating validity of the server certificate may be received. In one implementation, the validation acknowledgement may be received by the server certificate validation module 214.

At block 706, a reverse certificate look up verification process may be performed upon receipt of the acknowledgment. In one aspect, the reverse certificate look up verification process may be performed by:

determining existence of at least one of a first set of pre-stored data structure and a second set of pre-stored data structure upon navigating the tree site to verifier, wherein the tree site to verifier indicates a pre-stored data structure maintained by the client machine, correlating the pre-stored data structure, of the first set of pre-stored data structures or the second set of pre-stored data structures, with the data structure upon referring to a certificate issuer look up server, when at least one of the first set of pre-stored data structures and the second set of pre-stored data structures exists, wherein the correlation is performed to authenticate the server certificate, querying, by the certificate issuer look up server, one or more certificate issuing authorities to compute a first metadata, pertaining to the server certificate, based on a serial number when the pre-stored data structure is matched with the data structure, validating the first metadata with the data structure pertaining to the server certificate, notifying a first signal indicating threat of hacking on the client machine to a user when the first metadata is invalidated with the data structure thereby updating the tree site to verifier with the first metadata when the first metadata is validated with the data structure, enabling the client machine and a certificate authority verifier server to generate a random numeral and thereby executing a function on the random numeral and a certificate hash value of the server certificate present in the data structure, wherein the client machine and the certificate authority verifier server generate a first code and a second code respectively upon execution of the function, and notifying a second signal indicating the threat of hacking to the user when the first code and the second code are unmatched In one implementation, the aforementioned steps of the reverse certificate look up verification process may be performed by the reverse certificate look up verification module 216.

In one embodiment, the practical implementation of the system 102 is to create a mechanism that ensures an accurate and reliable server certificate verification in cases where the client system 104 or other surrounding infrastructure components have been compromised. More precisely, the system 102 ensures that the server to which any client machine 104 is connected is a server intended to be connected by the client machine 104. This may be accomplished by leveraging an additional verification layer (i.e. Reverse Certificate Lookup and Verification) that is performed in addition to the current certificate validation and the use of a client mechanism (i.e. Site to Validator tree) that facilitates detection of variations of the connection characteristics.

Although implementations for methods and systems for notifying hacking to a user thereby ensuring verified connection of the client machine with a server intended to be connected process have been described in language specific to structural features and/or methods, it is to be understood that the appended claims are not necessarily limited to the specific features or methods described. Rather, the specific features and methods are disclosed as examples of implementations for notifying hacking to the user.

The invention claimed is:

1. A method for notifying hacking to a user thereby ensuring verified connection of a client machine with a server intended to be connected characterized by validating a server certificate presented to the client machine, the method comprising:

acquiring, by a processor, a server certificate comprising data structure, wherein the data structure is acquired upon receipt of a response to a request initiated by the client machine, and wherein the data structure is referred to as a tree site to verifier pertaining to the request;

receiving, by the processor, a validation acknowledgement indicating validity of the server certificate; and performing, by the processor, a reverse certificate look up verification process upon receipt of the acknowledgment, wherein the reverse certificate look up verification is performed by, determining existence of at least one of a first set of pre-stored data structure and a second set of pre-stored data structure upon navigating the tree site to verifier, wherein the tree site to verifier indicates a pre-stored data structure maintained by the client machine, correlating the pre-stored data structure, of the first set of pre-stored data structures or the second set of pre-stored data structures, with the data structure upon referring to a certificate issuer look up server, when at least one of the first set of pre-stored data structures and the second set of pre-stored data structures exists, wherein the correlation is performed to authenticate the server certificate, querying, by the certificate issuer look up server, one or more certificate issuing authorities to compute a first metadata, pertaining to the server certificate, based on a serial number when the pre-stored data structure is matched with the data structure, wherein the first metadata is computed based on a pre-stored certificate identity, a pre-stored certificate hash value, a pre-stored certificate status, validating the first metadata with the data structure pertaining to the server certificate, notifying a first signal indicating threat of hacking on the client machine to a user when the first metadata is invalidated with the data structure thereby updating the tree site to verifier with the first metadata when the first metadata is validated with the data structure, enabling the client machine and a certificate authority verifier server to generate a random numeral and thereby executing a function on the random numeral and a certificate hash value of the server certificate present in the data structure, wherein the client machine and the certificate authority verifier server generate a first code and a second code respectively upon execution of the function, and notifying a second signal indicating the threat of hacking on the client machine to the user when the first code and the second code are unmatched, thereby ensuring connection of the client machine with the server intended to be connected by validating the server certificate issued to the client machine.

2. The method of claim 1, wherein the data structure comprises a site Uniform Resource Locator (URL), a server identity, a site network address, a certificate identity, a certificate hash value of the server certificate, a certificate Issuer, and a certificate verifier, and wherein the certificate hash value further comprises a validity, a certificate status, Last Check Time, Last Check Status, and Number of Visits.

3. The method of claim 1, wherein the first set of pre-stored data structure is acquired upon previously accessing the server, and wherein the second set of pre-stored data structure is retrieved from one or more peer machines communicatively coupled with the client machine, and wherein the second set of pre-stored data structure is retrieved when the first set of pre-stored data structure is unavailable, and wherein the second set of pre-stored data structures is retrieved based on a weighted score assigned to each peer, of the one or more peer machines, by using a predefined formulation.

4. The method of claim 1, wherein the first metadata is invalidated with the data structure when the pre-stored certificate identity, the pre-stored certificate hash value, and the pre-stored certificate status are unmatched with the certificate identity, the certificate hash value, and the certificate status respectively.

5. A system for notifying hacking to a user thereby ensuring verified connection of a client machine with a server intended to be connected characterized by validating a server certificate issued to the client machine, the system comprising:

a processor; and a memory coupled to the processor, wherein the processor is capable of executing a plurality of modules stored in the memory, and wherein the plurality of modules comprising:

an acquisition module for acquiring a server certificate comprising data structure, wherein the data structure is acquired upon receipt of a response to a request initiated by the client machine, and wherein the data structure is referred to as a tree site to verifier pertaining to the request;

a server certificate validation module for receiving a validation acknowledgement indicating validity of the server certificate; and a reverse certificate look up verification module for performing a reverse certificate look up verification process upon receipt of the acknowledgment, wherein the reverse certificate look up verification is performed by, determining existence of at least one of a first set of pre-stored data structure and a second set of pre-stored data structure upon navigating the tree site to verifier, wherein the tree site to verifier indicates a pre-stored data structure maintained by the client machine, correlating the pre-stored data structure, of the first set of pre-stored data structures or the second set of pre-stored data structures, with the data structure upon referring to a certificate issuer look up server, when at least one of the first set of pre-stored data structures and the second set of pre-stored data structures exists, wherein the correlation is performed to authenticate the server certificate, querying, by the certificate issuer look up server, one or more certificate issuing authorities to compute a first metadata, pertaining to the server certificate, based on a serial number when the pre-stored data structure is matched with the data structure, wherein the first metadata is computed based on a pre-stored certificate identity, a pre-stored certificate hash value, a pre-stored certificate status, validating the first metadata with the data structure pertaining to the server certificate, notifying a first signal indicating threat of hacking on the client machine to a user when the first metadata is invalidated with the data structure thereby updating the tree site to verifier with the first metadata when the first metadata is validated with the data structure, enabling the client machine and a certificate authority verifier server to generate a random numeral and thereby executing a function on the random numeral and a certificate hash value of the server certificate present in the data structure, wherein the client machine and the certificate authority verifier server generate a first code and a second code respectively upon execution of the function, and notifying a second signal indicating the threat of hacking on the client machine to the user when the first code and the second code are unmatched, thereby ensuring connection of the client machine with the server intended to be connected by validating the server certificate issued to the client machine.

6. The system of claim 5, wherein the data structure comprises a site Uniform Resource Locator (URL), a server identity, a site network address, a certificate identity, a certificate hash value of the server certificate, a certificate Issuer, and a certificate verifier, and wherein the certificate hash value further comprises a validity, a certificate status, Last Check Time, Last Check Status, and Number of Visits.

7. The system of claim 5, wherein the acquisition module acquires the first set of pre-stored data structure upon previously accessing the server, and wherein the second set of pre-stored data structure is retrieved from one or more peer machines communicatively coupled with the client machine, and wherein the second set of pre-stored data structure is retrieved when the first set of pre-stored data structure is unavailable, and wherein the second set of pre-stored data structures is retrieved based on a weighted score assigned to each peer, of the one or more peer machines, by using a predefined formulation.

8. The system of claim 5, wherein the first metadata is invalidated with the data structure when the pre-stored certificate identity, the pre-stored certificate hash value, and the pre-stored certificate status are unmatched with the certificate identity, the certificate hash value, and the certificate status respectively.

9. A non-transitory computer readable medium embodying a program executable in a computing device for notifying hacking, of a client machine, to a user thereby ensuring verified connection of the client machine with a server intended to be connected characterized by validating a server certificate issued to the client machine, the program comprising a program code:
  a program code for acquiring a server certificate comprising data structure, wherein the data structure is acquired upon receipt of a response to a request initiated by the client machine, and wherein the data structure is referred to as a tree site to verifier pertaining to the request;
  a program code for receiving a validation acknowledgement indicating validity of the server certificate; and
  a program code for performing a reverse certificate look up verification process upon receipt of the acknowledgment, wherein the reverse certificate look up verification is performed by,
    determining existence of at least one of a first set of pre-stored data structure and a second set of pre-stored data structure upon navigating the tree site to verifier, wherein the tree site to verifier indicates a pre-stored data structure maintained by the client machine,
    correlating the pre-stored data structure, of the first set of pre-stored data structures or the second set of pre-stored data structures, with the data structure upon referring to a certificate issuer look up server, when at least one of the first set of pre-stored data structures and the second set of pre-stored data structures exists, wherein the correlation is performed to authenticate the server certificate,
    querying, by the certificate issuer look up server, one or more certificate issuing authorities to compute a first metadata, pertaining to the server certificate, based on a serial number when the pre-stored data structure is matched with the data structure, wherein the first metadata is computed based on a pre-stored certificate identity, a pre-stored certificate hash value, a pre-stored certificate status,
    validating the first metadata with the data structure pertaining to the server certificate,
    notifying a first signal indicating threat of hacking on the client machine to a user when the first metadata is invalidated with the data structure thereby updating the tree site to verifier with the first metadata when the first metadata is validated with the data structure,
    enabling the client machine and a certificate authority verifier server to generate a random numeral and thereby executing a function on the random numeral and a certificate hash value of the server certificate present in the data structure, wherein the client machine and the certificate authority verifier server generate a first code and a second code respectively upon execution of the function, and
    notifying a second signal indicating the threat of hacking on the client machine to the user when the first code and the second code are unmatched,
  thereby ensuring connection of the client machine with the server intended to be connected by validating the server certificate issued to the client machine.

* * * * *